United States Patent [19]
Fortier et al.

[11] Patent Number: 4,581,393
[45] Date of Patent: Apr. 8, 1986

[54] GLASS FIBER REINFORCED VINYLIZED EPOXY COMPOSITIONS WITH REDUCED FIBER PROMINENCE

[75] Inventors: Lorraine J. Fortier, Ajax, Canada; Henry G. Heck, Wellesley, Mass.

[73] Assignee: The Dow Chemical Company, Midland, Mich.

[21] Appl. No.: 704,672

[22] Filed: Feb. 22, 1985

Related U.S. Application Data

[63] Continuation-in-part of Ser. No. 468,258, Feb. 22, 1983, abandoned.

[51] Int. Cl.$^4$ .......................... C08K 9/06; C08K 7/14; C08K 3/40
[52] U.S. Cl. ..................................... 523/217; 523/214; 523/444; 523/466; 523/513; 523/527; 524/700
[58] Field of Search ............... 523/214, 217, 513, 527, 523/466, 444; 524/700

[56] References Cited

U.S. PATENT DOCUMENTS

| | | | |
|---|---|---|---|
| Re. 30,583 | 4/1981 | Nelson | 525/531 |
| 3,432,458 | 3/1969 | Kwan et al. | 523/514 |
| 3,637,618 | 1/1972 | May | 528/112 |
| 3,773,856 | 11/1973 | Takiyama et al. | 525/529 |
| 3,922,247 | 11/1975 | Hazen et al. | 525/523 |
| 3,997,306 | 12/1976 | Hedden | 528/112 |
| 4,197,390 | 4/1980 | Jackson | 528/115 |
| 4,348,500 | 9/1982 | Ganguli et al. | 525/512 |

OTHER PUBLICATIONS

Derwent Abs., 20940 B/11, (2-79), (J54016592).
Derwent Abs., 90105 D/49, (10-81), (J56136850).
Derwent Abs., 54252 D/30, (6-81), (J56069118).

Primary Examiner—Herbert J. Lilling

[57] ABSTRACT

Compositions of a vinylized epoxy resin, sized glass fibers and a complexing agent exhibit reduced fiber prominence upon curing with a metal composition than when employing no complexing agent.

19 Claims, No Drawings

GLASS FIBER REINFORCED VINYLIZED EPOXY COMPOSITIONS WITH REDUCED FIBER PROMINENCE

CROSS-REFERENCE TO RELATED APPLICATION

This Application is a continuation-in-part of copending U.S. patent application Ser. No. 468,258, filed Feb. 22, 1983 and now abandoned.

BACKGROUND OF THE INVENTION

This invention relates to glass fiber-reinforced plastic compositions.

Vinylized epoxy resins, such as vinyl ester or unsaturated polyester resins comprise a well known class of thermosettable polymers. When formulated as fiber-reinforced plastic structures, they are used in corrosion-resistant applications. Typical formulations comprising vinyl ester resins include plastic composite sheet molding compounds, resin transfer moldings and hand lay-ups. For example, such resins are dissolved in a solvent or reactive diluent such as styrene, reinforced if desired, to obtain greater strength and modulus, applied to a substrate; and cured.

Vinyl ester or unsaturated polyester resins are typically prepared by reacting an unsaturated monocarboxylic acid with an epoxy resin such that a resin containing the characteristic vinyl ester moiety is provided. The physical properties of the vinyl ester resins will typically depend upon factors such as the epoxy reactants and the copolymerizable monomers which are employed. Additionally, certain inert reinforcing agents can be employed.

Vinylized epoxy plastics can be reinforced with glass fibers. Such fibers provide structural stability and electrical insulative properties to the plastics. These plastics find many uses, especially in the construction industry.

Typically, the glass fibers are treated with an organosilane coupling or sizing composition to facilitate its compatibility with the resin. The adhesion of resin and glass is improved and the glass is protected from abrasion during its production, shipping, and eventual use. These sizings have been selected such that the organic portion of the sizing will be partially soluble in and react with the resins.

Unfortunately, it has been observed that vinylized epoxy resins reinforced with sized glass fibers can display fiber prominence or a weakening at areas of high stress when cured using a metal composition. Typically, fiber prominence has been observed when sized glass fibers are used to reinforce vinyl ester or unsaturated polyester resins which have been diluted to a slightly acidic or basic pH, for example in styrene diluted resins. The phenomenon especially occurs when the resin has a pH greater than about 5.7 measured as a 10 percent methanol solution.

Therefore, it would be desirable to provide a composition and a method for preparing glass fiber-reinforced vinylized epoxy resins, which when cured using a metal composition, will display reduced fiber prominence.

SUMMARY OF THE INVENTION

This invention is a composition comprising an admixture of sized glass fiber, a vinylized epoxy resin and a metal composition curing agent. Upon curing, fiber prominence can occur. A complexing agent for the metal composition is added in a functionally, effective amount such that less fiber prominence occurs upon curing the admixture than if no complexing agent is employed.

In another aspect, the invention comprises an improvement in a process for preparing an intimate admixture of sized glass fiber and a vinylized epoxy resin, which admixtures are curable using a metal composition and normally exhibits fiber prominence upon curing. The improvement comprises contacting the admixture with a functionally effective amount of a complexing agent for the metal composition. The amount is sufficient to provide less fiber prominence upon curing the admixture than if no complexing agent is employed.

The process invention is useful in providing glass fiber reinforced vinylized epoxy resins which are curable with a metal composition and have reduced fiber prominence.

The compositions are useful in a wide variety of high performance engineering thermoset applications in which good mechanical properties and high heat distortion temperatures are required. Such compositions can be cured to provide compositions useful in a wide variety of applications such as fiber reinforced laminates; composites such as in fiberglass reinforced plastics and in glass reinforced plastic pipe; casting and molding resins; adhesives; encapsulants; coatings such as radiation curable coatings; and the like.

DESCRIPTION OF THE INVENTION

Glass fiber reinforcements are commercially available from many sources. They are supplied in a variety of forms, for example as continuous strand roving, woven roving, woven fabrics, reinforcing mats, combination mats, surfacing mats, chopped strands, and melted fibers. As available commercially, the fibers are coated with a small amount of "sizing". Generally, the sizing comprises an organo-silane coupling agent, a polymeric substance, a lubricant, and an antistatic agent. The sizing facilitates processing, establishes compatibility with various thermoset and thermoplastic resins, and imparts processability during fabrication of components.

The vinylized epoxy resins of the invention are typically prepared by reacting an ethylenically unsaturated monomer with an epoxy compound. Preferably, the ethylenically unsaturated monomer is an unsaturated carboxylic acid, or an acrylamide. Most preferred are the unsaturated carboxylic acids which are used to prepare vinyl ester or unsaturated polyester resins, as taught in, for example, U.S. Pat. Nos. 3,066,112; 3,179,623; 3,256,226; 3,301,743 and 3,367,992.

Unsaturated monocarboxylic acids include acrylic acid, methacrylic acid, halogenated acrylic or methacrylic acid, cinnamic acid and the like and mixtures thereof. Also included within the terms "unsaturated carboxylic acids" are the hydroxyalkyl acrylate or methacrylate half esters of dicarboxyl acids as described in U.S. Pat. No. 3,367,992 wherein the hydroxyalkyl group preferably has from 2 to about 6 carbon atoms.

Epoxy compounds useful in preparing the vinyl ester resins of the invention include a wide variety of epoxy compounds. Typically, the epoxy compounds are epoxy resins which are also referred to as polyepoxides. Polyepoxides useful herein can be monomeric (i.e., the diglycidyl ether of bisphenol A), advanced higher molecular weight resins, or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized di-unsaturated acid esters, epoxidized unsaturated polyesters, and mixtures thereof. Numerous polyepoxides prepared from polyhydric phenols include those which are disclosed, for example, in U.S. Pat. No. 4,431,782. Polyepoxides can be prepared from mono-, di- and trihydric phenols, and can include the novolac resins. Polyepoxides can include the epoxidized cycloolefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, *Handbook of Epoxy Resins*, Chapter 2, McGraw Hill, New York (1967).

While the invention is applicable to polyepoxides, generally preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

The polyepoxide may also include a minor amount of a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

In order to form the vinyl ester resins, the polyepoxides are typically reacted with ethylenically unsaturated acids. The unsaturated acids employed herein in forming the vinyl ester group are protonic acids preferably having a dissociation constant of at least about $1 \times 10^{-7}$, most preferably at least $1 \times 10^{-5}$. Such acids are normally organic carboxylic acids and are more preferably monocarboxylic acids. Suitable acids include, for example, acrylic acid, methacrylic acid, maleic acid, itaconic acid, cinnanic acid, longer chain acids such as oleic acid, linoleic acid, tall oil acid and dimer acids, and the half esters of hydroxy alkyl acrylates and methacrylates formed, for example, by reacting 2-hydroxyethyl acrylate with phthalic anhydride, maleic anhydride, succinic anhydride and the like. Acrylic acid and methacrylic acid are the most preferred monocarboxylic acids. Mixtures of saturated acids and the acids bearing polymerizable vinyl groups can also be used, for example, as a means of limiting the vinyl functionality of the product. Mixtures of saturated acids and the acids bearing polymerizable vinyl groups can also be used. Mixtures of this type represent a means of limiting the vinyl functionality of the product, etc.

Polymerization or process inhibitors can be advantageously added and process inhibitors are added to prevent premature polymerization during the prepartion of the vinyl ester resin. Typical inhibitors are t-butyl catechol, monomethyl ether of hydroquinone (MEHQ) or hydroquinone. A functionally effective amount of the process inhibitor is added, i.e., an amount sufficient to inhibit the polymerization of the vinyl ester resin.

Vinyl ester/unsaturated polyester resin blends are also effectively stabilized. The blends may be prepared either by physically mixing the two resins in the desired proportions or by preparing said vinyl ester resin in the presence of said unsaturated polyester.

Preferably, as is generally true in the thermosettable resin art, the resin phase is blended with a copolymerizable monomer. Suitable monomers include vinyl aromatic compounds such as styrene, vinyl toluene, divinyl benzene and the like. Other useful monomers include the esters of saturated alcohols such as methyl, ethyl, isopropyl, octyl, etc., with acrylic acid or methacrylic acid; vinyl acetate, diallyl maleate, dimethallyl fumarate; mixtures of the same and all other monomers which are capable of copolymerizing with the vinyl ester resin.

The vinyl polymerization is induced and maintained by conventional free radical catalysts and elevated temperatures. The concentration of the catalyst can vary from about 0.001 to about 10 percent, preferably from about 0.2 to about 3.0 percent by weight of resin; however, any effective catalytic amount is satisfactory. Illustrative catalysts are the well-known free radical type of vinyl polymerization catalysts, for example, the peroxides, the ketone peroxides, persulfates, perborates, percarbonates, azo compounds, peroxy esters, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)-peroxide, p-monomethoxybenzoyl peroxide, rubrene peroxide, methyl ethyl ketone peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo-1-cyclohexane carbonitrile, dimethyl, alpha,alpha'-azo-isobutyrate, 4,4'-azo-4-cyanopentanoic acid, azobisisobutyronitrile, persuccinic acid, diisopropyl peroxy dicarbonate, 2,5-dimethyl-2,5-bis-(2-ethylhexoylperoxy)hexane, and the like; a mixture of catalysts can also be used.

The vinyl polymerization can also be carried out with an inert organic solvent present. Illustrative thereof are toluene, benzene, o-xylene, acetonitrile, ethyl acetate, hexane, heptane, dicyclohexane, dioxane, acetone, N,N-dimethylformamide, N,N-dimethylacetamide, halogenated solvents and the like, including those known in the art as being suitable solvents for the polymerization of vinyl monomers. The only requirement in the selection of the inert solvent is that it does not substantially interfere with the monomer's polymerization reaction. Any solvent, if used, can be removed before further conversion of the polymerization product to a vinyl ester compound. However, it is preferable to remove the solvent before dilution with a reactive diluent.

The vinyl polymerization system can also contain small amounts of from about 0.1 to 2 percent by weight of a chain transfer agent based on the weight of vinyl monomer in the dispersed phase. Alkyl mercaptans having from one to twenty carbon atoms in the alkyl chain may be employed in the present invention. Representative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, stearyl mercaptan. Other chain transfer agents such as disulfides and halogenated compounds, especially brominated compounds, can be used.

The vinylized epoxy resins can be cured using a cure system to ensure complete polymerization, and provide a uniform hardening of the resins. The cure system can comprise a metal composition, which can act as a cure promoter. Typically, the metal composition is a redox active metal salt. Generally, the naphthenate and octoate salts of cobalt, manganese, nickel, vanadium, and molybdenum are employed. Preferably, cobalt naphthenate is employed. A functionally effective amount of the metal composition is employed; i.e., an amount sufficient to cure the vinylized epoxy resins. Typically, the amount can be from about 0.0001 to about 0.1 parts per 100 parts resin, preferably about 0.001 parts per 100 parts resin is employed; however, any effective curing amount is satisfactory.

Other accelerators and promoters which may be employed in addition to the metal salts typically are dimethylaniline, N,N-dimethyltoluidine and similar amines. The amount of these amines will vary, preferably from 0.01 to 0.5 percent by weight of the resin phase.

Certain vinylized epoxy resins, when cured using a metal composition and reinforced with sized glass fibers, display fiber prominence. Fiber prominence is measured as glints per area. Glints are the number of glass fibers which can be observed in the resin through a microscope. The more glints that are visible, the worse the fiber prominence, and the less acceptable the resin. Typically, fiber prominence is observed in areas of high stress, such as knuckles or flanges of the resin. Such a phenomenon causes a general weakening of the resin-glass bond, and can cause delamination in some cases.

According to the process of the invention, fiber prominence can be reduced when preparing vinylized epoxy resins reinforced with sized glass fibers and using a metal composition in the cure system, if a complexing agent for the metal composition is employed in the curing system. The complexing agent can also be called a scavenger, or scavenging agent. Suitable complexing agents are strong acids, and complexing compositions with a high log of complex stability constant. Such compositions and their constants are recorded, for example, in *Critical Stability Constants*, ed. by Arthur E. Martel, and Robert M. Smith, published by Plenum Press, New York, N.Y., 1977. Preferably, the acids will have a pKa of less than about 2.0, and the complexing compositions have a log of complex stability constant of at least 5.0; however, any acid or complexing agent capable of complexing with the metal composition can be employed. Preferably, enolizable ketones, more preferably the enolizable β-diketones, and most preferably, 2,4-pentanedione are employed as complexing compositions. A functionally effective amount of the complexing agent can vary from about 0.001 to about 2.0 percent, preferably 0.05 percent by weight of resin; however, any complexing amount is satisfactory.

A preferred acid complexing agent is maleic acid which can be attached as a half ester to the resin molecule or to another molecule.

Optimum ratios of the resin and cure system ingredients can be easily determined by preliminary tests.

The resin composition can be formulated in any order. Typically, the promoters (a metal composition, preferably a redox metal, and often dimethylaniline) are added to the resin and mixed followed by addition of peroxide and finally by glass fiber addition. The metal complexing agent can be added at any time or may even be the vehicle for the metal compositions.

In the curing of vinyl ester resin, the choice of curing agent can influence the cure rate, the exotherm and resultant properties of the finished product. The curing agents or initiators most commonly used to effect crosslinking or cure of vinyl ester resins are organic peroxides or hydroperoxides. Decomposition of these initiators can be effected by heat or by the use of accelerators or promoters which cause a more rapid decomposition of the initiator at a given temperature. The accelerators most commonly employed are the tertiary amines and the metallic soaps, such as cobalt or manganese octoate or naphthenate. See, Paul F. Bruins, ed., "Unsaturated Polyester Technology", Gordon and Breach Science Publishers, New York, 1976, p. 329.

The following examples illustrate the inventive concept and the best mode for carrying out that concept.

COMPARATIVE EXAMPLE 1

For comparison purposes, a glass fiber is tested to determine if it causes fiber prominence in vinyl ester and unsaturated polyester resins. Fiber prominence is measured by the number of glints per 10 square inches.

E glass fibers are electrical grade glass fibers intended for chemical resistant service and are manufactured by Fiberglas Canada. The fibers are believed to be sized with an organosilane solution containing maleic anhydride to provide reactive vinyl functionality.

A vinyl ester resin is prepared by reacting about 1 equivalent of methacrylic acid with 0.75 equivalent of an epoxy novolac having an epoxide equivalent weight (EEW) of 175–182 (D.E.N. ®438 epoxy novolac available from The Dow Chemical Company) and 0.25 equivalent of a glycidyl polyether of bisphenol A having an EEW of 186–192 (D.E.R. ®331 epoxy resin available from The Dow Chemical Company). The above reactants are heated to 115° C. with catalyst and hydroquinone so that the carboxylic acid content reaches about 1 percent. The reaction products are cooled and then styrene containing 50 ppm of t-butyl catechol is added to a styrene content of 36 percent. The final resin diluted with styrene has a pH of 7.3, measured as a 10 percent methanol solution. This resin is denoted Resin A.

A laminate is made from 3 layers of 1.5 oz chopped strand mat E glass fibers, and Resin A. A cure system of 0.3 percent based on weight of resin of 6 percent cobalt naphthenate and 1.5 percent based on resin of methyl ethyl ketone peroxide is employed. The laminate is allowed to cure for 48 hours at room temperature.

Another laminate, Laminate 2, is made with the same system except the glass fibers are exposed to 1200° F. for 2 hours to burn off the sizing before mixing with Resin A and the cure system.

Laminate 1 is checked for fiber prominence and is found to contain about 1000 glints per 10 square inches.

When Laminate 2 is checked for fiber prominence no glints are formed. Therefore, the fiber prominence phenomenon depends on whether or not the glass fibers are sized, and this type of sized glass fibers causes fiber prominence in vinyl ester resins.

EXAMPLE 1

Laminates are made from 3 layers of 1.5 oz. chopped strand mat E glass fibers using Resin A and the cobalt naphthenate, methyl ethyl ketone peroxide cure system of the previous example. Two samples of the invention are prepared using different blends of the above described Resin A and a second resin, Resin B.

Resin B is prepared by catalytically reacting 0.05 equivalents of bisphenol A with 0.25 equivalents of a diglycidal ether or bisphenol A having an epoxy equivalent weight between 186 and 192 to form a polyepoxide having an epoxy equivalent weight of about 275. After cooling, 1 equivalent of an epoxy novolac having an epoxy equivalent weight between 172 and 182, and 1.05 equivalents of methacrylic acid are added and reacted to an acid content of 1 percent. Then 0.75 equivalents of maleic anhydride is added and reacted to an acid content of 5 percent. The final resin is diluted with styrene containing 5 parts per million of t-butyl catechol to a styrene content of 33 percent, and has a pH of 4.5.

A comparative example is prepared using Resin A only. After curing for 48 hours at room temperature, the laminates are examined for fiber prominence. The results are shown in Table I.

TABLE I

| Sample No. | Resin | pH | Appearance |
|---|---|---|---|
| C-1* | 100% Resin A | 7.3 | Approx. 1000 glint/10 in$^2$ |
| 1 | 96% Resin A 4% Resin B | 6.0 | 50 glints/10 in$^2$ |
| 2 | 94% Resin A 5% Resin B | 5.7 | 10 glints/10 in$^2$ |

The results demonstrate the effectiveness of a strong acid (the maleic anhidride present on Resin B) as the redox active metal complexing agent.

EXAMPLE 2

Laminates are made from 3 layers of 1.5 oz chopped strand mat, E glass fibers and Resin A. Different cure systems are used as designated in Table II. The laminates are allowed to cure for 48 hours at room temperature and then checked for fiber prominence. The results are compiled in Table II.

TABLE II

| | Cure System | | | | | | |
|---|---|---|---|---|---|---|---|
| Sample | Catalyst | Amount % | Promoter | Amount % | Complexing Agent | Amount % | Remarks |
| C-2* | MEKP | 1.5 | 6% CoN | 0.3 | — | — | 1000 glints/10 in$^2$ |
| C-3* | MEKP | 1.5 | 6% CoN | 0.5 | — | — | 1000 glints/10 in$^2$ |
| C-4* | MEKP | 1.5 | 6% CoN | 0.9 | — | — | 1000 glints/10 in$^2$ |
| C-5* | Bz$_2$O$_2$ | 1 | DMA | 0.1 | — | — | no glints |
| C-6* | Bz$_2$O$_2$ | 1 | 6% CoN DMA | 0.3 0.1 | — | — | no glints |
| 3 | MEKP | 1.5 | 6% CoN | 0.3 | 2,4-P | 0.05 | 3 glints/10 in$^2$ |

MEKP is methyl ethyl ketone peroxide.
Bz$_2$O$_2$ is benzoyl peroxide.
CoN is cobalt naphthenate.
DMA is dimethylaniline.
2,4-P is 2,4-pentanedione.
*Not an example of the invention.

The results demonstrate that fiber prominence depends on a cure system which employs a redox active metal (cobalt naphthenate). The benzoyl peroxide/-dimethylaniline curing system did not induce fiber prominence (C-5 and C-6). Even the addition of cobalt naphthenate to this system (C-6) failed to produce the phenomenon because the cobalt napthenate does not affect the curing of the benzoyl peroxide/dimethylaniline system. The methyl ethyl ketone cure system (C-2 to C-4) is dependent on the cobalt naphthenate, and produces fiber prominence at all levels of cobalt. In Sample 3, 2,4-pentane dione, an organic complexing agent with a log of stability constant greater than 5.0, is added to the methyl ethyl ketone/cobalt naphthenate cure system, and fiber prominence is substantially reduced.

EXAMPLE 3

Two laminates are made from 5 layers of E glass fibers chopped strand mat. The formulation used Resin B plus 0.1 percent dimethylaniline; 0.3 percent cobalt naphthenate and 1 percent methyl ethyl ketone peroxide. To the second formulation is added 0.05 percent of 2,4-pentanedione(2,4-P).

Upon curing, the control without 2,4-P exhibited glinting while the laminate with 2,4-P showed no glinting.

Other portions of the compositions are wound and cured on a 2-inch pipe mandrel with the same results.

The examples illustrate that the unmodified combination of thermosetting resin, redox active metal salt, and sized glass fiber reinforcement develops fiber prominence.

The examples show that fiber prominence is reduced or eliminated by adding a complexing agent for the redox active metal to the resin. In Example 2, maleic anhydride is employed as an effective complexing agent. In Examples 3 and 4, 2,4-pentanedione is an effective complexing agent.

Though not intended to be binding, it is believed that fiber prominence is caused when the glass fibers have a stronger acid functionality than any of the other components of the resin and especially when the sizing has an acid functionality with a pKa of 3.0 or less. To measure the pKa of the sizing, the sizing can be removed from the fibers, and analyzed according to known methods. The glass fibers complex with the metal of the cure system at the glass and resin interface, and removes metal from the system. Therefore, portions of the resin are poorly cured, and fiber prominence occurs.

It is further believed that when a complexing agent is employed in the cure system, it can effectively complete with the acidic glass sizing for the metal. The complexing agent can be an acid with an acid functionality essentially equal to or stronger than the acid functionality on the sizing. Also, complexing compositions with a log of complex stability constant are effective. By complexing with the metal, the complexing agent retain the metal in the cure system, so the resin is properly cured, and fiber prominence is reduced. As shown in the examples, fiber prominence is caused when using glass fibers sized with maleic anhydride. When the vinyl ester resins are modified with maleic anhydride, fiber prominence is substantially reduced. Also, when 2,4-pentanedione is employed in the cure system, fiber prominence is reduced.

What is claimed is:

1. A composition comprising
   (a) an admixture comprising
      (1) sized glass fiber,
      (2) a vinylized epoxy resin, and
      (3) a metal composition curing agent; wherein upon curing, fiber prominence can occur; and
   (b) a functionally effective amount of a complexing agent for said metal composition, said amount being sufficient to provide less fiber prominence upon curing said admixture than if no complexing agent is employed.

2. The composition of claim 1 wherein said vinylized epoxy resin is a vinyl ester or unsaturated polyester resin.

3. The composition of claim 1 wherein said metal composition is a redox active metal salt.

4. The composition of claim 2 wherein said metal composition is a redox active metal salt.

5. The composition of claim 3 wherein said redox active metal salt is cobalt naphthenate.

6. The composition of claim 1 wherein said complexing agent is a strong acid with a pKa of less than about 2.0.

7. The composition of claim 1 wherein said complexing agent has a log of complex stability constant of greater than about 5.0.

8. The composition of claim 7 wherein said complexing agent is an enolizable ketone.

9. The composition of claim 8 wherein said complexing agent is 2,4-pentanedione.

10. The composition of claim 6 wherein said complexing agent is maleic anhydride.

11. In a process for preparing an admixture of sized glass fibers, a vinylized epoxy resin, and a metal composition curing agent wherein when the admixture is cured fiber prominence can occur, the improvement comprising
    contacting said admixture with a functionally effective amount of a complexing agent for said metal composition, said amount being sufficient to provide less fiber prominence upon curing said admixture than if no complexing agent is employed.

12. The process of claim 11 wherein said vinylized epoxy resin is a vinyl ester or unsaturated polyester resin.

13. The process of claim 12 wherein said metal composition is a redox active metal salt.

14. The process of claim 13 wherein said metal composition is cobalt naphthenate.

15. The process of claim 11 wherein said complexing agent is a strong acid with a pKa of less than about 2.0.

16. The process of claim 15 wherein said complexing agent is maleic anhydride.

17. The process of claim 11 wherein said complexing agent has a log of complex stability constant of greater than about 5.0.

18. The process of claim 17 wherein said complexing agent is an enolizable ketone.

19. The process of claim 19 wherein said complexing agent is 2,4-pentanedione.

* * * * *